United States Patent [19]

Trotter et al.

[11] 4,384,064

[45] May 17, 1983

[54] VINYL COPOLYMER ADHESIVES

[75] Inventors: Jimmy R. Trotter; James M. Hawkins; Richard L. McConnell, all of Kingsport, Tenn.

[73] Assignee: National Starch And Chemical Corporation, Bridgewater, N.J.

[21] Appl. No.: 155,048

[22] Filed: Jun. 2, 1980

[51] Int. Cl.$^3$ .......................... C08K 5/17; C08K 5/05; C08K 5/06; C08K 5/09

[52] U.S. Cl. .............................. 524/239; 524/369; 524/377; 524/394

[58] Field of Search ................. 260/29.6 H, 29.6 ME, 260/29.6 E, 29.6 M; 252/316; 523/176, 177; 524/239, 369, 377, 394

[56] References Cited

U.S. PATENT DOCUMENTS

| | | | |
|---|---|---|---|
| 3,576,776 | 4/1971 | Muszik et al. | 260/22 |
| 3,964,832 | 6/1976 | Cohen et al. | 401/75 |
| 4,174,331 | 11/1979 | Myles | 260/29.1 R |

FOREIGN PATENT DOCUMENTS 49-9097067 9/1974 Japan.
49-9097068 9/1974 Japan.
53-3017646 2/1978 Japan.

Primary Examiner—Lorenzo B. Hayes
Assistant Examiner—Amelia B. Yarbrough

[57] ABSTRACT

Disclosed is a spreadable solid adhesive composition comprising
(A) from about 10 to about 30% by weight of a copolymer of
  (a) an acrylamide or substituted acrylamide and
  (b) an unsaturated mono or dicarboxylic acid having 2 to 6 carbon atoms or an alkali metal salt thereof, said copolymer having an I.V. of about 0.1–3.0,
(B) from about 1 to about 10% by weight of a gelling agent selected from the group consisting of (1) dibenzal sorbitol, (2) alkali metal salts of saturated or unsaturated aliphatic acids having from 12 to 20 carbon atoms, and (3) calcium or magnesium salts of saturated or unsaturated aliphatic acids having from 12 to 20 carbon atoms complexed with the tetrasodium salt of ethylenediaminetetraacetic acid, and
(C) from about 67 to about 89% by weight of water or a mixture of alcohol and water.

16 Claims, No Drawings

VINYL COPOLYMER ADHESIVES

TECHNICAL FIELD

This invention relates generally to adhesive sticks, and more particularly to adhesive compositions comprising a vinyl copolymer and particular gelling agent formed into an adhesive stick.

BACKGROUND PRIOR ART

Adhesive sticks are known in the art. For example, U.S. Pat. Nos. 3,964,832 and 3,576,776 relate to gel compositions useful as carriers for various adhesive compositions. Furthermore, it is known in the art to use dibenzal sorbitol as a gelling agent for solid adhesives of poly(vinyl pyrrolidone), poly(vinyl formal), poly(vinyl butyral), poly(vinyl alcohol), poly(vinyl acetate), vinyl acetate copolymers, nitrocellulose and poly(vinyl chloride). See for example, Japanese Pat. Nos. J49097-067; J50078-628; J53017-646; J53023-337; JA-4844329-Q; JA-4840835-Q and J49036-740.

Copending application Ser. No. 116,129 filed Jan. 28, 1980, now U.S. Pat. No. 4,257,928, relates to adhesive sticks comprising water dispersible polyesters.

DISCLOSURE OF THE INVENTION

The present invention provides a spreadable solid adhesive composition comprising (A) from about 10 to about 30% by weight of a copolymer of (a) about 50–98% by weight of an acrylamide of the formula

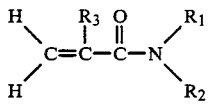

wherein $R_1$ and $R_2$ are each H or an alkyl group having 1 to 8 carbon atoms and $R_3$ is H or $CH_3$ and (b) about 50–2% by weight of an unsaturated mono or dicarboxylic acid having 2 to 6 carbon atoms or an alkali metal salt thereof, said copolymer having an I.V. of about 0.1–3.0, (B) from about 1 to about 10% by weight of a gelling agent selected from the group consisting of (1) dibenzal sorbitol, (2) alkali metal salts of saturated or unsaturated aliphatic acids having from 12 to 20 carbon atoms, and (3) calcium or magnesium salts or saturated or unsaturated aliphatic acids having from 12 to 20 carbon atoms complexed with the tetrasodium salt of ethylenediaminetetraacetic acid, and (C) from about 67 to about 89% by weight of water or a mixture of alcohol having 1 to 4 carbon atoms and water.

The adhesives are spreadable when in solid form and are rub-on adhesives for substrates such as paper and cardboard.

BEST MODE FOR CARRYING OUT THE INVENTION

The present invention provides a solid spreadable adhesive composition, sometimes referred to as gelled stick adhesive which is especially useful for spreading directly from the solid form onto a substrate. The adhesive composition comprises about 10–30% by weight of an acrylamide/unsaturated carboxylic acid copolymer, about 1–10% by weight of a gelling agent, and about 67–89% by weight of a solvent.

The acrylamide used in the copolymer portion has the general formula

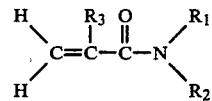

where $R_1$ and $R_2$ are each H or an alkyl group having 1 to 8 carbon atoms, and $R_3$ is H or $CH_3$. Preferred acrylamides include acrylamide, N-isopropylacrylamide, N,N-dimethylacrylamide, N-ethylacrylamide, and N-n-butylacrylamide. Such compounds are commercially available or may be prepared using techniques well known in the art.

The unsaturated carboxylic acid portion of the copolymer may be either a mono- or dicarboxylic acid having 2 to 6 carbon atoms or an alkali metal salt thereof. Preferred acids include acrylic acid, methacrylic acid, itaconic acid and crotonic acid. If alkali metal salts of these acids are used, the sodium, potassium or lithium salts are used.

The acrylamide/unsaturated carboxylic acid copolymer is prepared by conventional copolymerization techniques using about 50–98% by weight acrylamide and about 50–2% by weight of the unsaturated carboxylic acid, the weights being based on the weight of the copolymer. The copolymerization is continued until an inherent viscosity (I.V.) of from about 0.1 to about 3.0 is reached. The I.V. is measured in a 0.25% by weight solids solution in N,N-dimethylformamide.

The gelling agent used in accordance with this invention may be (1) dibenzal sorbitol, (2) an alkali metal salt of a saturated or unsaturated aliphatic acid having from 12 to 20 carbon atoms, or (3) calcium or magnesium salts of saturated or unsaturated aliphatic acids having from 12 to 20 carbon atoms complexed with the tetrasodium salt of ethylenediaminetetraacetic acid.

Dibenzal sorbitol is a commercially available compound, for example, Gel All-D, a product of New Japan Chemical Company. When dibenzal sorbitol is used it is preferred that it be present in an amount of from about 1–3%, preferably about 1.5–2.5% by weight of the adhesive compositions.

Alkali metal salts of saturated or unsaturated aliphatic acids having 12 to 20 carbon atoms are also available commercially. For example, sodium stearate, lithium stearate, potassium stearate, sodium palmitate, sodium oleate, or blends thereof may be used. When these gelling agents are used, they are preferably used in amounts of about 7–10% by weight of the adhesive composition.

Calcium or magnesium stearate may be used as gelling agents when complexed with the tetrasodium salt or ethylenediaminetetraacetic acid in accordance with conventional procedures. When these gelling agents are used, they are preferably used in amounts of about 6–10% by weight of the adhesive composition.

A mixture of alcohol and water or water alone may be used as solvent for the copolymer and gelling agent. Alcohols having from 1 to 4 carbon atoms may be used, although ethanol is preferred. The ratio of alcohol to water may vary over a wide range, i.e., from about 0.1–99% by weight alcohol to about 99.9–1% by weight water. The solvent accounts for from about 67–89% by weight of the adhesive composition.

The solid adhesive composition is prepared by thoroughly blending the copolymer, gelling agent and solvent. The solution is heated to reflux and stirred until the solids are dissolved, and then the azeotrope of alcohol and water is distilled off. The solution is poured, while hot, into suitable containers for subsequent cooling and gelling.

Small amounts, i.e., up to about 10% by weight of the vinyl copolymer, of other additives may be used in the adhesive compositions according to this invention. For example, small amounts of plasticizers and stabilizers, as well as pigments, fillers, dyes, perfumes, etc., may be included.

The T-peel bond strength is obtained on samples of brown kraft paper which have been bonded with the glue sticks and allowed to set for a predetermined time and temperature. The bond strength is obtained with an Instron Tester and 2 inches/minute peel rate. The strength of the bonds is determined by the so-called "Peel Test" based on a modification of the ASTM "T-Peel Test" set forth on pages 63 and 64 of the 1964 edition of the BOOK OF ASTM STANDARDS, published by the American Society for Testing Materials, and more specifically identified as Test Number D-1876-61-T.

The time for the adhesive to form a paper-tearing bond is determined by spreading the adhesive on one edge of brown kraft paper using 5 strokes of the stick. Another sheet of the paper is placed on the first and pressed together. Samples are split by hand every 15 seconds. The shortest time required for the adhesive to tear the paper is designated as the set-up time.

The following examples are submitted for a better understanding of the invention.

EXAMPLE 1

A 90/10 N-isopropylacrylamide/sodium acrylate copolymer (15 g; 1.68 I.V.), 35 g of distilled water, and 75 g of a 2% solution of Gel All-D in ethanol are placed in a 500-ml, three-neck, round-bottom flask fitted with a mechanical stirrer, thermometer and condenser. These components are then blended together at 80° C. When the components are fully blended, 60 ml (about 48 g) of the ethanol/water azeotrope are removed by distillation. The resulting hot solution is poured at 80° C. into polypropylene medical-type syringes, whose tips have been cut off, and the mixture is allowed to cool and gel. The syringes are capped to minimize the loss of solvent. The resulting colorless, translucent gelled blend has a firm consistency and is easily applied to paper.

The gelled blend is applied to 30-lb. Kraft paper using 5 strokes of the stick adhesive. A second piece of Kraft paper is placed on the first and pressed together. The bonded Kraft paper samples are peeled apart by hand after 15-sec. intervals to determine the bond set time; this blend has a bond set time of 75 sec. The initial bond T-peel strength of the bonded Kraft paper samples are determined with an Instron tester at 2 in./min. peel rate after aging the bonds for 24 hr. at 23° C. This blend produces bonds having peel strengths of 1.5 lb./in.-width and the bonds are fiber tearing. Aging bonds 1 wk. at 23° and 50° C. does not deleteriously affect the peel strengths of bonds made with this blend. Similarly good results are achieved using 90/10 N-isopropylacrylamide/potassium acrylate copolymer or 90/10 N-isopropylacrylamide/lithium acrylate copolymer instead of the 90/10 N-isopropylacrylamide/sodium acrylate copolymer.

Similarly good results are also achieved when 20 g of the 90/10 N-isopropylacrylamide/sodium acrylate copolymer are dissolved in 100 ml of water and the solution is gelled with 10 g of sodium stearate.

EXAMPLE 2

The procedure of Example 1 is repeated, except that 15 g of 90/10 N-isopropylacrylamide/acrylic acid copolymer (I.V. of 1.58) is blended with 35 g of distilled water, and 75 g of a 2% solution of Gel All-D in ethanol. Again 60 ml of the ethanol/water azeotrope is removed by distillation.

The resulting gelled blend has a firm consistency and is easily applied to paper. On 30-lb. Kraft paper, this blend produces bonds having a set time of 60 sec. and a T-peel strength of 0.6 lb./in-width (slight fiber tear).

EXAMPLE 3—(Control)

The procedure of Example 1 is repeated, except that 50 g of a 20% solution of poly(N-isopropylacrylamide) (I.V. of 2.0) in water is blended with 75 g of a 2% solution of Gel All-D in ethanol. Initially, the polymer and Gel All-D solutions are miscible at 80° C. However, after almost 50 ml of the ethanol/water azeotrope is removed by distillation, the polymer precipitates, thus rendering the blend unsatisfactory for use as a gelled stick adhesive. Thus, this example illustrates an inoperative polymer species.

EXAMPLE 4—(Control)

The procedure of Example 1 is repeated, except that 50 g of a 20% solution of poly(acrylic acid) (I.V. of 1.6) in water is blended with 75 g of a 2% solution of Gel All-D in ethanol. Initially, the polymer and Gel All-D solutions are miscible at 80° C. After 95 ml of the ethanol/water azeotrope are removed by distillation, a whitish, very soft material that would not gel at 23° C. is obtained. This blend, because of its very soft consistency at 23° C., is not satisfactory for use as a gelled stick adhesive. This example illustrates an inoperative polymer species.

EXAMPLE 5—(Control)

The procedure of Example 1 is repeated, except that 50 g of a 20% solution of poly(sodium acrylate) (I.V. of 1.6) is blended with 75 g of a 2% solution of Gel All-D in ethanol. When the two solutions are combined and heating and stirring are begun, the polymer precipitates from the solution. Because of the precipitation, this polymer is not useful as a base polymer for gelled stick adhesives containing Gel All-D.

EXAMPLE 6

The procedure of Example 1 is repeated, except that 15 g of 90/10 N-isopropylacrylamide/sodium methacrylate copolymer (1.5 I.V.) is blended with 35 g of distilled water and 75 g of a 2% solution of Gel All-D in ethanol. Again 60 ml of the ethanol/water azeotrope is removed by distillation.

The resulting gelled blend is firm and is easily applied to paper. On 30-lb. Kraft paper, the blend produces bonds having set times of 90 sec. and a T-peel strength of 1.3 lb./in.-width (fiber tear).

Similarly good results are obtained when a 90/10 acrylamide/sodium methacrylate copolymer (I.V. 1.8)

is used instead of the 90/10 N-isopropylacrylamide/sodium methacrylate copolymer.

EXAMPLE 7

The procedure of Example 1 is repeated, except that 10 g of 90/10 N-isopropylacrylamide/sodium acrylate copolymer (0.1 I.V.) is blended with 35 g of distilled water, and 75 g of a 2% solution of Gel All-D in ethanol. In this example 87.5 ml (70 g) of the ethanol/water azeotrope is removed by distillation. The resulting gelled blend produces paper tearing bonds on 30-lb. Kraft paper within 1-2 minutes.

EXAMPLE 8

The procedure of Example 1 is repeated, except that 30 g of 90/10 N-isopropylacrylamide/sodium acrylate copolymer (3.0 I.V.) is blended with 45 g of distilled water, and 75 g of a 2% solution of Gel All-D in ethanol. The resulting gelled blend produces paper tearing bonds on 30-lb. Kraft paper within 2-3 minutes.

EXAMPLE 9

The procedure of Example 1 is repeated, except that 15 g of 98/2 N-isopropylacrylamide/sodium acrylate copolymer (2.1 I.V.) is blended with 35 g distilled water, and 75 g of a 2% solution of Gel All-D in ethanol. Again 60 ml of the ethanol/water azeotrope is removed by distillation. The resulting gelled blend produces paper tearing bonds on 30-lb. Kraft paper within 1-2 minutes.

EXAMPLE 10

The procedure of Example 1 is repeated, except that 15 g of 50/50 N-isopropylacrylamide/sodium acrylate copolymer (1.3 I.V.) is blended with 35 g of distilled water, and 75 g of a 2% solution of Gel All-D in ethanol. Again 60 ml of the ethanol/water azeotrope is removed by distillation. The resulting gelled blend produces paper tearing bonds on 30-lb. Kraft paper within 1-2 minutes.

Similarly good results are achieved when a 50/50 N,N-dimethylacrylamide/sodium acrylate copolymer (I.V. 1.6) is used instead of the 50/50 N-isopropylacrylamide/sodium acrylate copolymer.

EXAMPLE 11

The procedure of Example 1 is repeated, except that 27.5 g of 50/50 N-isopropylacrylamide/sodium acrylate copolymer (1.68 I.V.) is blended with 35 g of distilled water, and 75 g of a 2% solution of Gel All-D in ethanol. Sixty milliliters of the ethanol/water azeotrope is removed by distillation. The resulting gelled blend produces paper tearing bonds on 30-lb. Kraft paper within 1-2 minutes.

EXAMPLE 12

The procedure of Example 1 is repeated, except that 10 g of 50/50 N-isopropylacrylamide/sodium acrylate copolymer (1.68 I.V.) is blended with 35 g of distilled water, and 75 g of a 2% solution of Gel All-D in ethanol. Sixty milliliters of the ethanol/water azeotrope is removed by distillation. The resulting gelled blend produces paper tearing bonds on 30-lb. Kraft paper within 2-3 minutes.

EXAMPLE 13

In a 500 ml, three-neck flask fitted with a mechanical stirrer, thermometer, and condenser, 45 grams of distilled water and 6 grams of the tetrasodium salt of ethylenediaminetetraacetic acid are stirred at 23° C. until a homogeneous solution is obtained. While stirring, 6 grams of calcium stearate and 55.5 g of ethanol are added in that order to the solution. The mixture is heated to 65° C. with stirring until a homogeneous solution is obtained. To the resulting solution, 37.5 grams of a 90/10 N-isopropylacrylamide/acrylic acid copolymer (I.V. of 1.58) is added at 55° C. This mixture is heated to 65° C. and stirred until a homogeneous blend is obtained. The resulting hot blend is poured at 65° C. into a polypropylene medical-type syringe, capped, and cooled as in Example 1. The resulting gelled blend produces fiber tearing bonds on 30-lb. Kraft paper.

Unless otherwise specified, all parts, percentages, ratios, etc. are on a weight basis.

The invention has been described in detail with particular reference to preferred embodiments thereof, but it will be understood that variations and modifications can be effected within the spirit and scope of the invention.

We claim:

1. A spreadable solid adhesive composition comprising
   (A) from about 10 to about 30% by weight of a copolymer of
      (a) about 50–98% by weight of an acrylamide of the formula

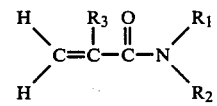

wherein $R_1$ and $R_2$ are each H or an alkyl group having 1 to 8 carbon atoms and $R_3$ is H or $CH_3$, and
      (b) about 50–2% by weight of an unsaturated mono or dicarboxylic acid having 2 to 6 carbon atoms or an alkali metal salt thereof, said copolymer having an inherent viscosity of about 0.1–3.0,
   (B) from about 1 to about 10% by weight of a gelling agent selected from the group consisting of (1) dibenzal sorbitol, (2) alkali metal salts of saturated or unsaturated aliphatic acids having from 12 to 20 carbon atoms, and (3) calcium or magnesium salts of saturated or unsaturated aliphatic acids having from 12 to 20 carbon atoms complexed with the tetrasodium salt of ethylenediaminetetraacetic acid, and
   (C) from about 67 to about 89% by weight of a solvent selected from water and mixtures of at least one alcohol having 1 to 4 carbon atoms and water.

2. A composition according to claim 1 wherein said gelling agent is dibenzal sorbitol.

3. A composition according to claim 2 wherein said dibenzal sorbitol is present in an amount of about 1–3% by weight of the composition.

4. A composition according to claim 1 wherein said gelling agent is selected from the group consisting of alkali metal salts of acids having from 12 to 20 carbon atoms and calcium or magnesium salts of aliphatic acids having from 12 to 20 carbon atoms complexed with the tetrasodium salt of ethylenediaminetetraacetic acid.

5. A composition according to claim 4 wherein said gelling agent is sodium stearate.

6. A composition according to claim 4 wherein said gelling agent is present in an amount of about 7–10% by weight of the composition.

7. A composition according to claim 1 wherein said alcohol is ethanol.

8. A spreadable solid adhesive composition comprising (A) from about 10 to about 30% by weight of a copolymer of
(a) about 50–98% by weight of an acrylamide of the formula

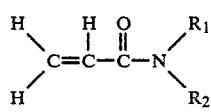

wherein $R_1$ and $R_2$ are each H or an alkyl group having 1 to 8 carbon atoms, and
(b) about 50–2% by weight of an acid selected from the group consisting of acrylic acid, methacrylic acid, itaconic acid and crotonic acid, said copolymer having an inherent viscosity of about 0.1–3.0, (B) from about 1 to about 10% by weight of a gelling agent selected from the group consisting of (1) dibenzal sorbitol, (2) alkali metal salts of saturated or unsaturated aliphatic acids having from 12 to 20 carbon atoms, and (3) calcium or magnesium salts of saturated or unsaturated aliphatic acids having from 12 to 20 carbon atoms complexed with the tetrasodium salt of ethylenediaminetetraacetic acid, and (C) from about 67 to about 89% by weight of a mixture of about 1–99% by weight alcohol having 1 to 4 carbon atoms and about 99–1% by weight water.

9. A composition according to claim 8 wherein said gelling agent is dibenzal sorbitol.

10. A composition according to claim 8 wherein said dibenzal sorbitol is present in an amount of about 1–3% by weight of the composition.

11. A composition according to claim 8 wherein said gelling agent is selected from the group consisting of alkali metal salts of acids having from 12 to 20 carbon atoms and calcium or magnesium salts of aliphatic acids having from 12 to 20 carbon atoms complexed with the tetrasodium salt of ethylenediaminetetraacetic acid.

12. A composition according to claim 11 wherein said gelling agent is sodium stearate.

13. A composition according to claim 11 wherein said gelling agent is present in an amount of about 7–10% by weight of the composition.

14. A composition according to claim 8 wherein said alcohol is ethanol.

15. A substrate coated with the adhesive composition of claim 1.

16. A substrate coated with the adhesive composition of claim 8.

* * * * *